(12) United States Patent
Michel et al.

(10) Patent No.: US 10,110,963 B1
(45) Date of Patent: Oct. 23, 2018

(54) SYSTEM, METHOD, AND COMPUTER PROGRAM FOR MEDIA CONTENT PLAYBACK MANAGEMENT

(71) Applicant: Amdocs Development Limited, Limassol (CY)

(72) Inventors: Christophe Michel, Chantepie (FR); Zvi Ronen, Rishon le Zion (IL)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/686,010

(22) Filed: Aug. 24, 2017

(51) Int. Cl.
  *H04N 21/475* (2011.01)
  *H04N 21/45* (2011.01)
  *H04N 21/442* (2011.01)

(52) U.S. Cl.
  CPC ... *H04N 21/4751* (2013.01); *H04N 21/44204* (2013.01); *H04N 21/44222* (2013.01); *H04N 21/4532* (2013.01); *H04N 21/4753* (2013.01)

(58) Field of Classification Search
  None
  See application file for complete search history.

(56) References Cited

U.S. PATENT DOCUMENTS

| | | |
|---|---|---|
| 8,005,987 B2 | 8/2011 | Richardson et al. |
| 8,649,659 B2 | 2/2014 | Lalwaney |

(Continued)

FOREIGN PATENT DOCUMENTS

| | | |
|---|---|---|
| WO | 2015081796 A1 | 6/2015 |

OTHER PUBLICATIONS

You Tube, Jul. 1, 2017, pp. 1-3, as retrieved by the Internet Archive Wayback Machine, https://web.archive.org/web/20170701000252/https://www.youtube.com/.

(Continued)

*Primary Examiner* — Alexander Q Huerta
(74) *Attorney, Agent, or Firm* — Zilka-Kotab, P.C.

(57) ABSTRACT

A system, method, and computer program product are provided for media content playback management. In operation, a profile system receives media information and current playback information associated with media content being played on a first device including a first streaming software agent capable of monitoring media data traffic from a plurality of different streaming media sources and a first local buffer for buffering the media content. The profile system identifies a profile associated with a user of the first device. The profile system stores the media information and the current playback information in association with the profile associated with the user of the first device. The profile system receives a request to play the media content on a second device including a second streaming software agent capable of monitoring the media data traffic from the plurality of different streaming media sources and a second local buffer for buffering the media content. The profile system identifies that the second device corresponds to the profile associated with the user of the first device. The profile system identifies the current playback information for the media content. Moreover, the profile system sends the current playback information for the media content to the second device such that the second device is capable of resuming playback of the media content where playback of the media content on the first device stopped. The profile system allows for anonymous access to various media players.

18 Claims, 9 Drawing Sheets

(56) References Cited

U.S. PATENT DOCUMENTS

| | | |
|---|---|---|
| 8,886,710 B2 | 11/2014 | Evans et al. |
| 8,984,153 B2 | 3/2015 | Evans et al. |
| 9,098,177 B2 | 8/2015 | Das |
| 9,209,987 B2 | 12/2015 | Bishop et al. |
| 9,432,429 B1* | 8/2016 | Ho .................. H04N 21/4302 |
| 9,549,021 B2 | 1/2017 | Arora et al. |
| 9,621,704 B2* | 4/2017 | Yang ...................... H04L 29/06 |
| 2007/0136488 A1* | 6/2007 | Cho ...................... H04N 7/163 709/231 |
| 2009/0043908 A1* | 2/2009 | Masunaga ............ G11B 27/105 709/231 |
| 2009/0259711 A1* | 10/2009 | Drieu ............... G06F 17/30053 709/201 |
| 2010/0027966 A1* | 2/2010 | Harrang ................. H04N 5/775 386/241 |
| 2010/0057782 A1* | 3/2010 | McGowan ......... H04N 21/2387 707/E17.009 |
| 2011/0320626 A1* | 12/2011 | Wong .............. H04N 21/41407 709/231 |
| 2012/0079095 A1* | 3/2012 | Evans ...................... G06F 8/61 709/224 |
| 2012/0114313 A1* | 5/2012 | Phillips ............ G11B 20/10527 386/298 |
| 2012/0210226 A1* | 8/2012 | McCoy ........... H04N 21/25816 715/719 |
| 2012/0210343 A1* | 8/2012 | McCoy ........... H04N 21/25875 725/25 |
| 2013/0051755 A1* | 2/2013 | Brown ............ H04N 21/25875 386/241 |
| 2014/0282749 A1* | 9/2014 | Joseph ............ H04N 21/25866 725/68 |
| 2015/0100993 A1* | 4/2015 | Lee ....................... H04N 5/765 725/90 |
| 2016/0057493 A1* | 2/2016 | Benea ............... H04N 21/4223 725/12 |
| 2016/0127799 A1* | 5/2016 | Alsina ............... H04N 21/6587 725/88 |
| 2017/0055032 A1* | 2/2017 | Oshima ........... H04N 21/25891 |

OTHER PUBLICATIONS

Netflix, Jul. 30, 2017, pp. 1-3, as retrieved by the Internet Archive Wayback Machine, https://web.archive.org/web/20170630155137/https://www.nefflix.com/.

* cited by examiner

SYSTEM, METHOD, AND COMPUTER PROGRAM FOR MEDIA CONTENT PLAYBACK MANAGEMENT

FIELD OF THE INVENTION

The present invention relates to media content playback on various devices, and more particularly to a system for media content playback management.

BACKGROUND

Media playback experiences have evolved from media being viewed by a user from a single location on a single device, to experiences where the same user can use multiple devices in many locations with more intermittent viewing.

As a consequence, users expect to be able to smoothly interrupt and resume media playback at any time, from any location, with the ability to switch from one device to another transparently. Currently, there is not a mechanism to efficiently meet the expectations of users because media players are heterogeneous across available devices, requiring specific usage conditions, including application installation and configuration, as well as registration and authentication.

There is thus a need for addressing these and/or other issues associated with the prior art.

SUMMARY

A system, method, and computer program product are provided for media content playback management. In operation, a profile system receives media information and current playback information associated with media content being played on a first device including a first streaming software agent capable of monitoring media data traffic from a plurality of different streaming media sources and a first local buffer for buffering the media content. The profile system identifies a profile associated with a user of the first device. The profile system stores the media information and the current playback information in association with the profile associated with the user of the first device. The profile system receives a request to play the media content on a second device including a second streaming software agent capable of monitoring the media data traffic from the plurality of different streaming media sources and a second local buffer for buffering the media content. The profile system identifies that the second device corresponds to the profile associated with the user of the first device. The profile system identifies the current playback information for the media content. Moreover, the profile system sends the current playback information for the media content to the second device such that the second device is capable of resuming playback of the media content where playback of the media content on the first device stopped. The profile system allows for anonymous access to various media players.

DETAILED DESCRIPTION

Figure 1:
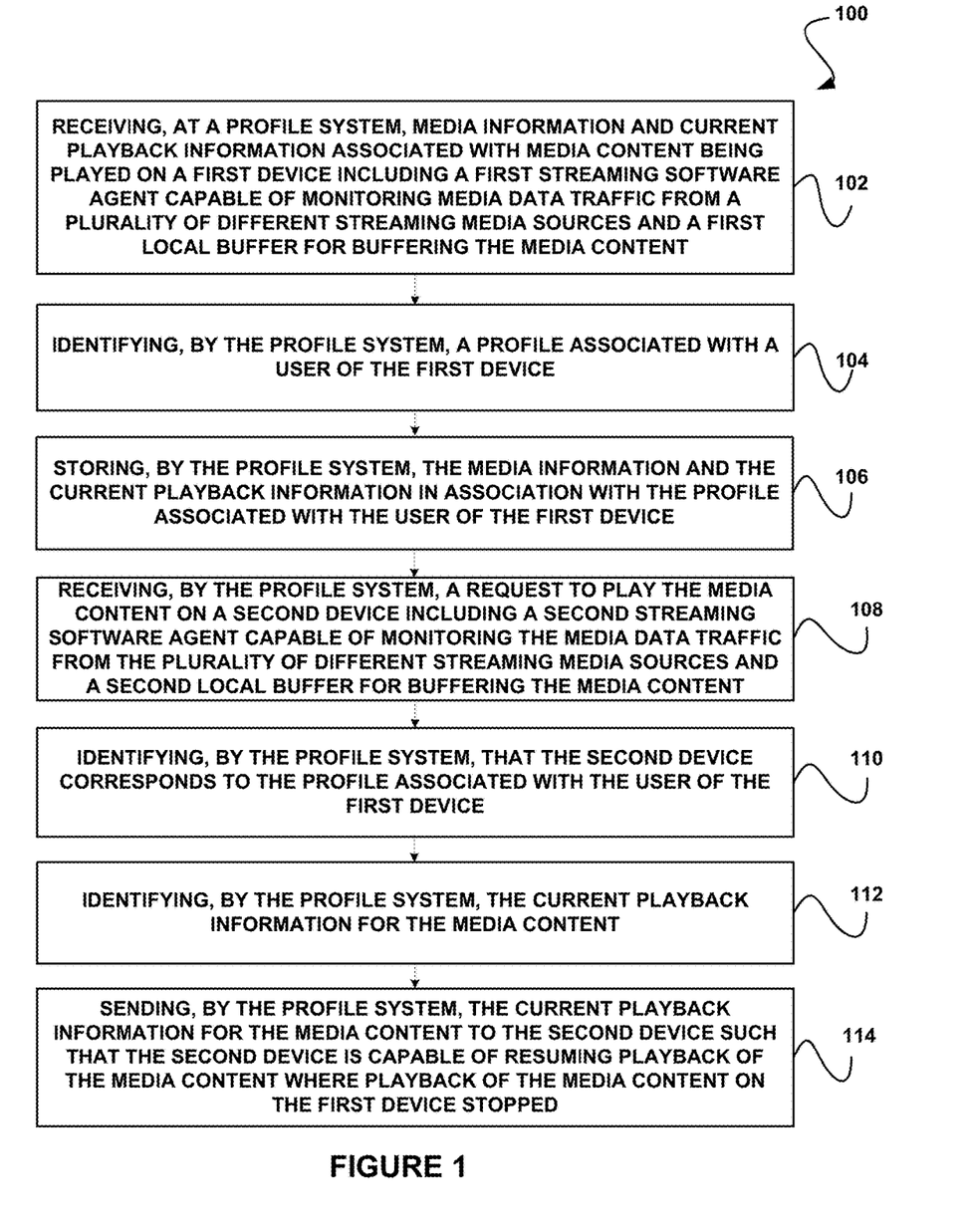
FIG. 1 illustrates a method for media content playback management, in accordance with one embodiment.

FIG. 1 illustrates a method 100 for media content playback management, in accordance with one embodiment.

In operation, a profile system receives media information and current playback information associated with media content being played on a first device including a first streaming software agent capable of monitoring media data traffic from a plurality of different streaming media sources and a first local buffer for buffering the media content. See operation 102. The media content may include any media content, such as streaming audio, streaming video, streaming games, and/or various other media content.

The different media sources may include any streaming or online media service provider, such as YouTube, Netflix, Amazon Video, etc. The profile system is separate from the system(s) providing the media content.

The media information may include any information associated with the media content, such as an identifier (e.g. a title, number, etc.), location (e.g. a URL, etc.), owner information, and/or various other information. The current playback information may include any information indicating a current play position of the media content (e.g. a time stamp, etc.).

The profile system identifies a profile associated with a user of the first device. See operation 104. The profile may include user information and/or device information associated with the first device and/or a user of the first device.

The profile system stores the media information and the current playback information in association with the profile associated with the user of the first device. See operation 106.

Subsequently, the profile system receives a request to play the media content on a second device including a second streaming software agent capable of monitoring the media data traffic from the plurality of different streaming media sources and a second local buffer for buffering the media content. See operation 108. For example, the user may try to play the media content at a later time from a device that is separate from the first device, or from the first device again, etc.

The profile system identifies that the second device corresponds to the profile associated with the user of the first device. See operation 110. In various embodiments, this may include utilizing credentials of a user of the second device and/or utilizing an identifier associated with the second device.

The profile system identifies the current playback information for the media content. See operation 112. In this case, the profile system may perform a lookup to find the current playback information utilizing media content information associated with the media content (e.g. a URL, a title, etc.) and/or user profile information.

Moreover, the profile system sends the current playback information for the media content to the second device such that the second device is capable of resuming playback of the media content where playback of the media content on the first device stopped. See operation 114. In one embodiment, the second streaming software agent may present a user interface on the second device giving the user the option to resume the media content at the stored position or from the beginning. In another embodiment, the second streaming software agent may cause the media content to resume automatically (e.g. upon the user playing the media content, etc.) where playback of the media content on the first device stopped.

The first and second device may include any device, such as a mobile phone, computer (e.g. a tablet computer, etc.), television (e.g. an Internet enabled television, etc.), an audio player, a media device in a vehicle, and/or various other devices. In various embodiments, the first and second devices may be the same type of device (e.g. a mobile phone, etc.), or different types of devices (e.g. a mobile phone and a television, etc.). Further, in one embodiment, the first device and the second device may be the same device. For example, the media content may be played on a device, halted for a period of time, and resumed on the same device. Additionally, it should be noted that playback may be resumed on another device after playback is halted on the second device. For example, playback may be resumed on a third device from a point where playback halted on the second device, etc. Further, in one embodiment, playback may be resumed on a different application. For example, play may be initiated on a first application, paused/stopped, and may be resumed later utilizing a second application (on the same device or a different device).

The local buffers associated with the streaming software agents may include any type of memory of the user device capable of buffering data.

The profile system allows for anonymous access to various media players. The profile system works for any media provider.

It should be noted that the method 100 may be implemented utilizing various systems, hardware, software, applications, user interfaces, etc., as dictated by the implementer. For example, the profile system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
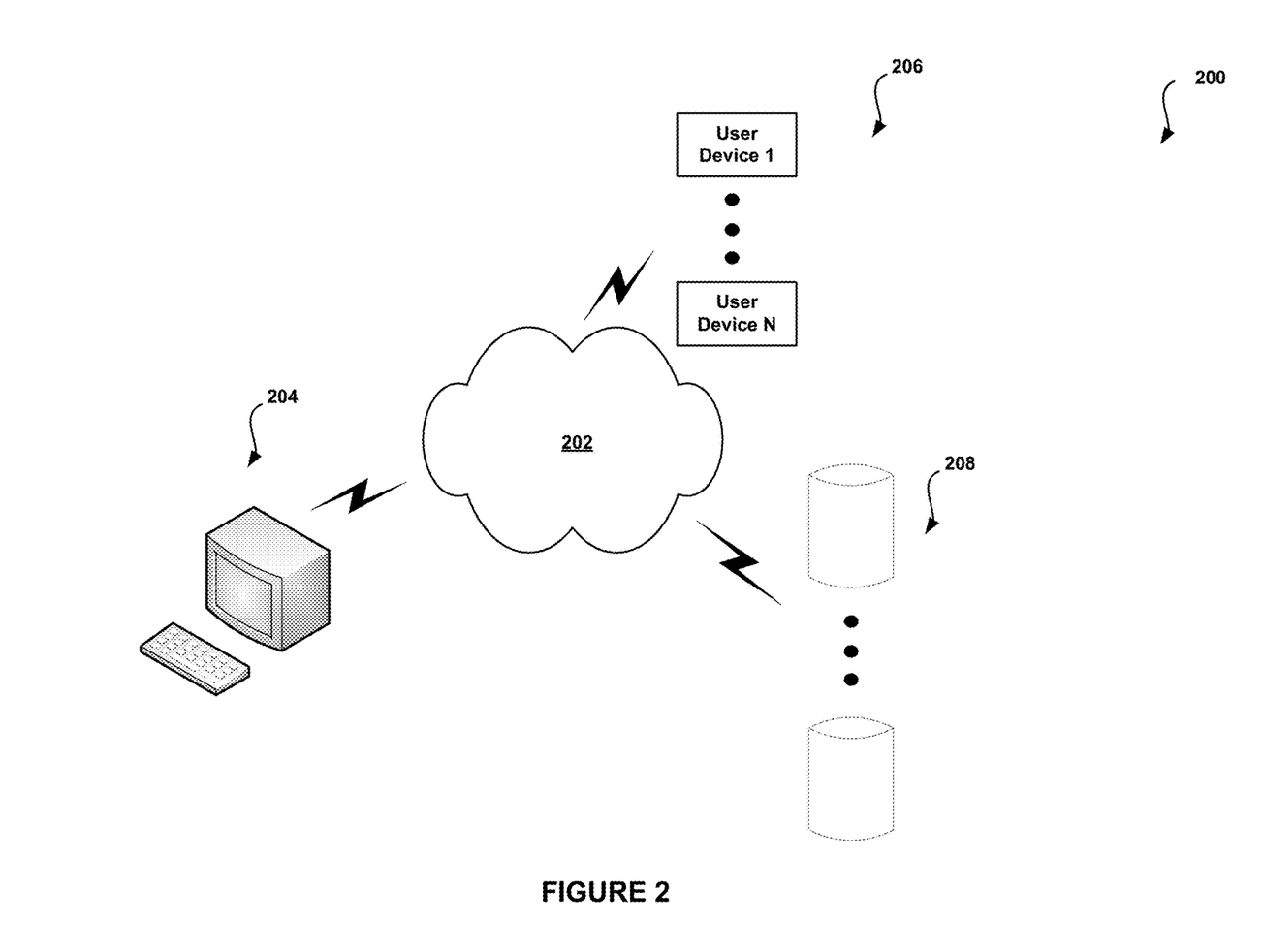
FIG. 2 shows a system for media content playback management, in accordance with one embodiment.

FIG. 2 shows a system 200 for media content playback management, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a profile system 204, which may implement a variety of applications or software, etc. The profile system 204 is capable of communicating with a plurality of user devices 206 over one or more networks 202 for performing media content playback management. The devices 206 may include any type of user device, such as smartphones, tablets, televisions, vehicle devices, etc. The user devices 206 may communicate with servers and systems 208 for accessing media content for streaming video and/or audio.

Media playback experiences have evolved from media being viewed by a user from a single location on a single device, to experiences where the same user can use multiple devices (e.g. smartphones, tablets, televisions, cars, etc.) in many locations with more intermittent experiences (e.g. experiencing an interruption in one location with one device and then resuming the play of the same media in another location on another device, etc.).

As a consequence, users expect to be able to smoothly interrupt and resume media playback at any time, from any location, with the ability to switch from one device to another transparently. Such media may include video and audio streaming, which includes radio, audio clips, video content, and streamed games, etc.

A typical user experience may include a user visualizing media on a mobile device until the user arrives home and can follow up with same media playback on a wider screen television or tablet, etc. As another example, a user may start consuming media, pause/stop the media due to time constraints and expect to view the media in whatever context/location the user will be in the future, from the point the user interrupted the previous visualization.

In order to be able to benefit from such smooth resuming experience, multiple issues need to be addressed. Media content may come from various sources/providers and require specific usage conditions, including registration/authentication. End-users expect to be able to consume media from any source transparently and protect their data privacy.

Additionally, media players are heterogeneous across available devices, and require specific usage conditions, including application installation and configuration, registration/authentication, where end-users expect to be able to consume media immediately.

The system 202 implements a solution that is agnostic from media providers (i.e. applicable for any media content provider, etc.) and operates at media streaming level by monitoring the network on devices, close to all applications. The profile system 204 and software agents that reside on the user devices 206 allow for centralized information storage to facilitate playback on any of the user devices 206.

The profile system 204 allows anonymous access to media content, not requiring registering of specific profile(s) including personal information that is stored and managed by media providers, providing a centralized profile not bounded (either commercially or technically) to any media provider.

As part of the system 200, the user devices 206 each include a silent software agent that operates as a proxy to the network for all media playing applications and monitors the media data traffic for capturing the source of media and its current playback position. The software agent communicates this information to the profile system 204 for later resuming from any device/application.

The profile system 204 authenticates any request from a software agent of a user device and stores the accessed media playback information (e.g. pause/resume related data, etc.) for enabling media playback on the user devices 206.

Figure 3:
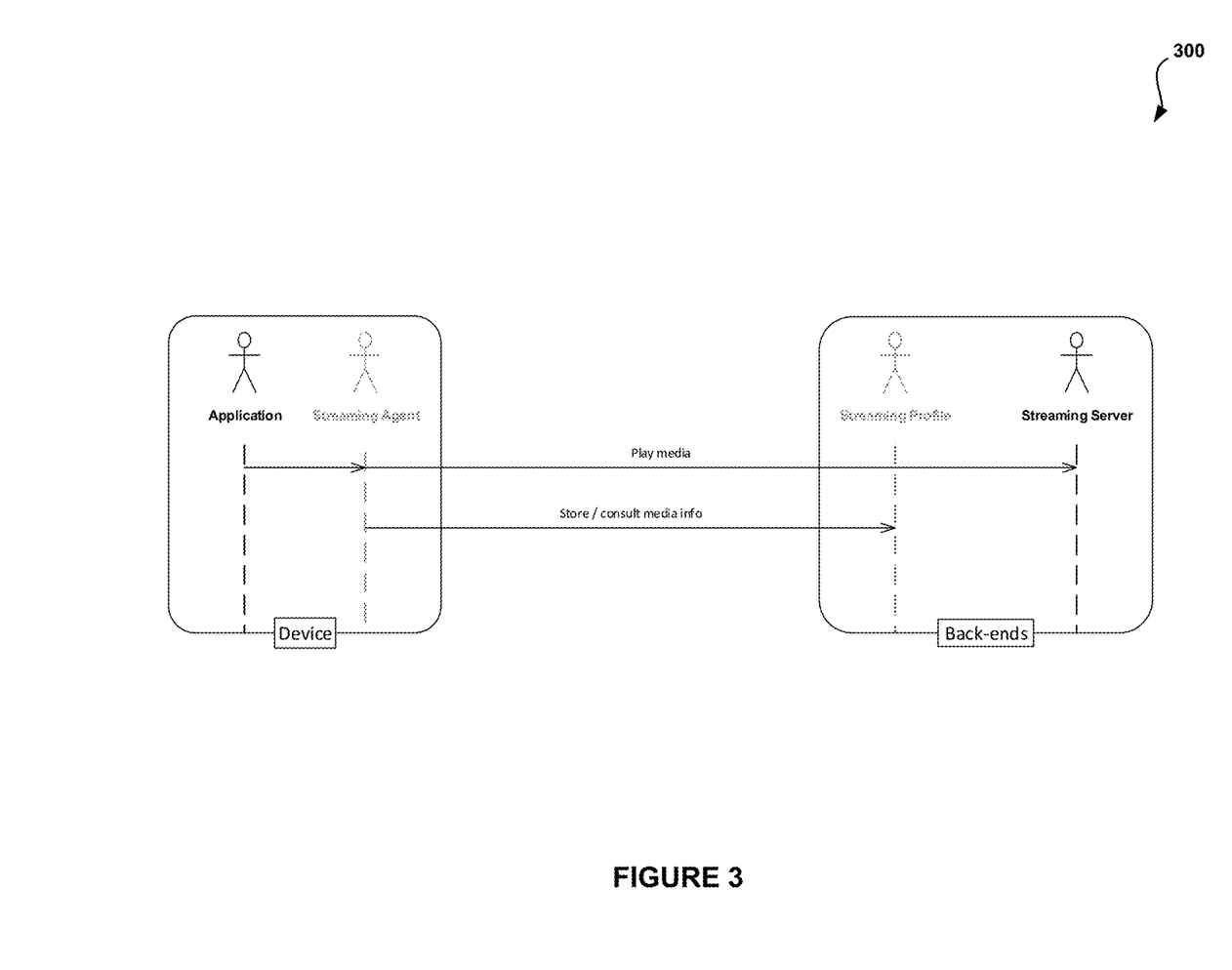
FIG. 3 shows a high level system flow diagram for media content playback management, in accordance with one embodiment.

FIG. 3 shows a high level system flow diagram 300 for media content playback management, in accordance with one embodiment. As an option, the system flow diagram 300 may be viewed in the context of the details of the previous figures and/or any subsequent figure(s). Of course, however, the system flow diagram 300 may be viewed in the context of any desired environment. Further, the aforementioned definitions may equally apply to the description below.

As shown, a software agent on a user device receives a request from a media player application. The software agent on the user device (or the application in one embodiment) sends a command to play media content to a media content provider system. The software agent sends media content information and playback information to a profile server/system for storage (e.g. under a user profile associated with the user device, etc.).

Together, the profile system and the user device (e.g. via the software agent, etc.) offers a complete system to monitor current playback on any device, and is able to propose current playback position storage for later resuming whenever playback is interrupted (e.g. stopped, paused, etc.).

The user device software agent identifies a media provider agnostic user profile that is playing media (e.g. the agent may be seamless/silent, per configuration, etc.), identifies the currently played media (e.g. the source, etc.), collects information on played media during its playback on the current device, detects any media playback interruption, and proposes (or performs automatically, per configuration, etc.) interrupted media playback position storage (to the profile system) for later resuming.

In response to a user device request, the profile system may propose (or perform automatically, per configuration, etc.) resuming playback upon user profile and media identification (e.g. received by the user device via the software agent, etc.), and clear playback resume stored information once the media has been fully consumed.

Figure 4:
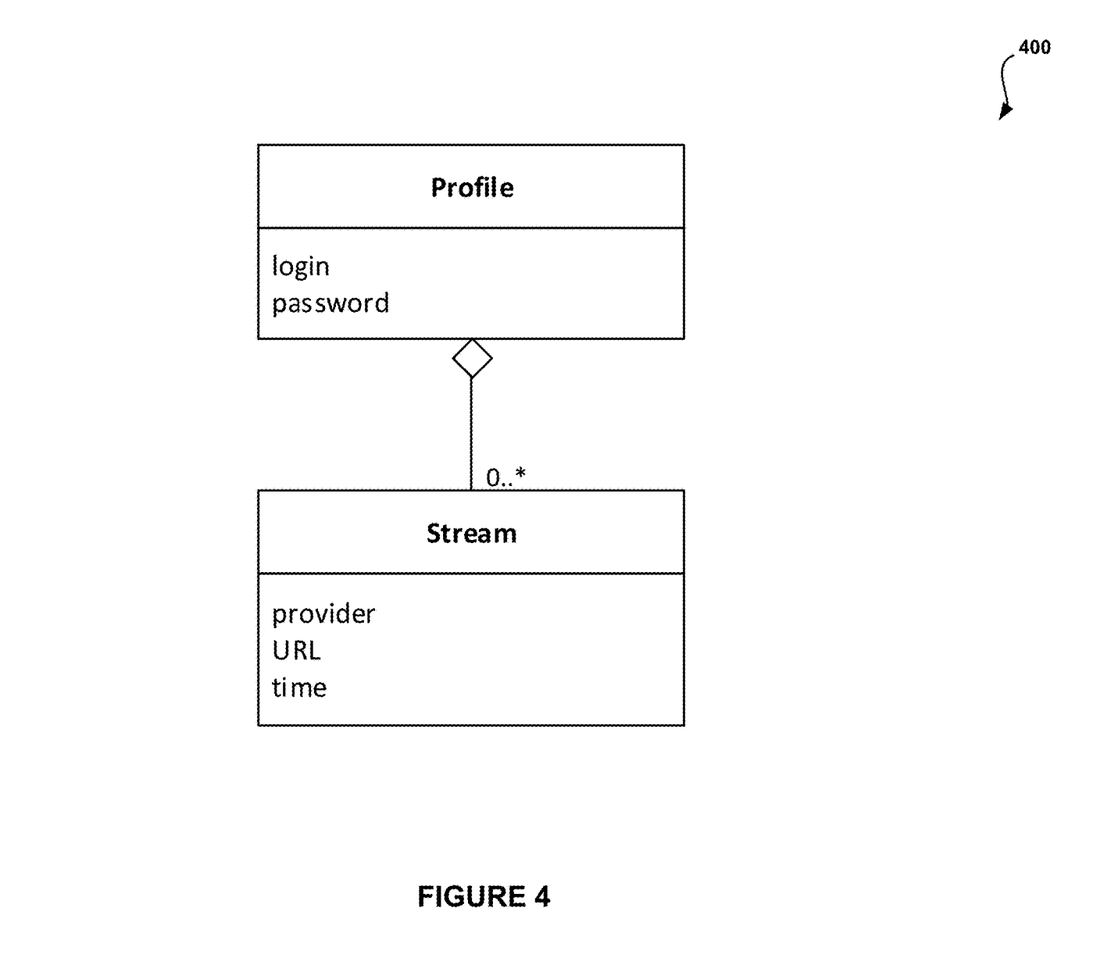
FIG. 4 shows a data structure for media content playback management, in accordance with one embodiment.

FIG. 4 shows a data structure 400 for media content playback management, in accordance with one embodiment. As an option, the data structure 400 may be viewed in the context of the details of the previous figures and/or any subsequent figure(s). Of course, however, the data structure 400 may be viewed in the context of any desired environment. Further, the aforementioned definitions may equally apply to the description below.

In one embodiment, the data structure may be used by a profile system to correlate user profile information to media content information (e.g. name of media, location of media, current play position of media, etc.).

In various embodiments, the streaming software agent on the user device may be a background application, daemon, an application extension plug-in, and/or various other code. Using a network side agent would allow only monitoring of network events, which is not sufficient, including a case of an application currently playing buffered media data with no network involved. Thus, the client side agent described herein allows for fine grain, real-time media playback monitoring, closer to the media application(s).

The software agent on the user device identifies a user profile and allows for multiple factor authentication by residing on the device. The software agent also monitors network traffic and application media consumption to identify both the current media source and current playback position.

The data source that is monitored includes media data downloaded through the network and also temporarily buffered media data that is already stored locally on a user device. The software agent may collect media information including source information, quality information, and playback position information, etc. The software agent may send any or all of this information to the profile system. The software agent on the user device detects any media playback interruption. In one embodiment, the software agent may also initiate user interactions (e.g. by proposing storing media information for later resume via a pop-up interface, by proposing media playback resume via an interface, etc.), based on information stored and provided by the profile server/system.

The profile system stores a centralized user profile for all users. The profile system stores, updates, and clears media information (e.g. for later resume, etc.) at the request of the software agents on the user devices.

Figure 5:
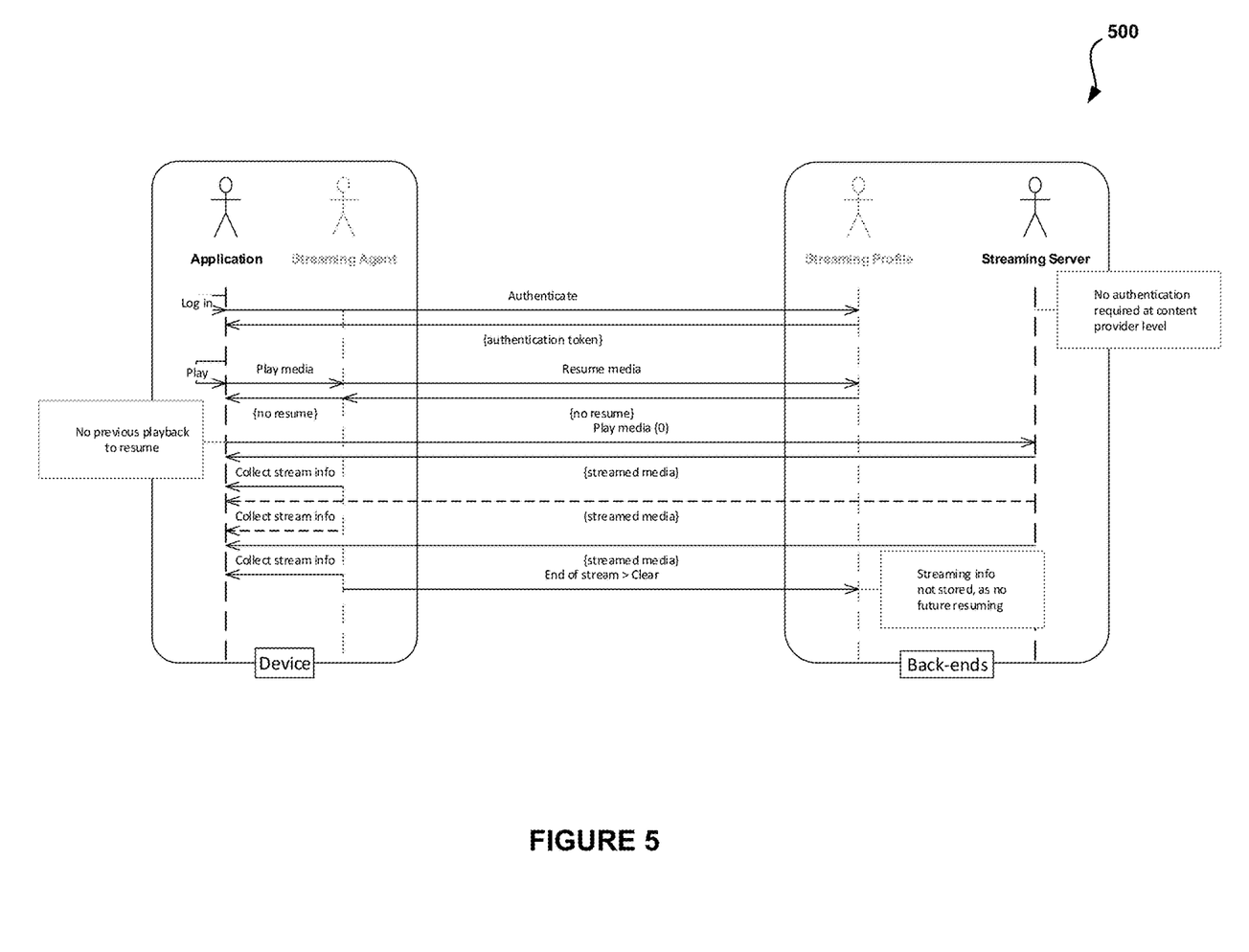
FIG. 5 shows a high level system flow diagram for media content playback management, including full media consumption on one device, in accordance with one embodiment.

FIG. 5 shows a high level system flow diagram 500 for media content playback management, including full media consumption on one device, in accordance with one embodiment. As an option, the system flow diagram 500 may be viewed in the context of the details of the previous figures and/or any subsequent figure(s). Of course, however, the system flow diagram 500 may be viewed in the context of any desired environment. Further, the aforementioned definitions may equally apply to the description below.

As shown, a user uses a media application on a user device to log in to a media player application (e.g. Netflix, etc.). An authentication request is sent to a profile system. In response, an authentication token is sent back to the user device. A request to play media is issued by the user device and the streaming software agent checks with the profile system to determine whether there is any playback/resume information stored for this particular media content. In this example, there is not any information stored so the media player application accesses the media content from the media content server (referred to as the Streaming Server). At the end of full play of the media content, the streaming software agent indicates that no playback/resume information needs to be stored by the profile server because the media content has been played in full.

Figure 6:
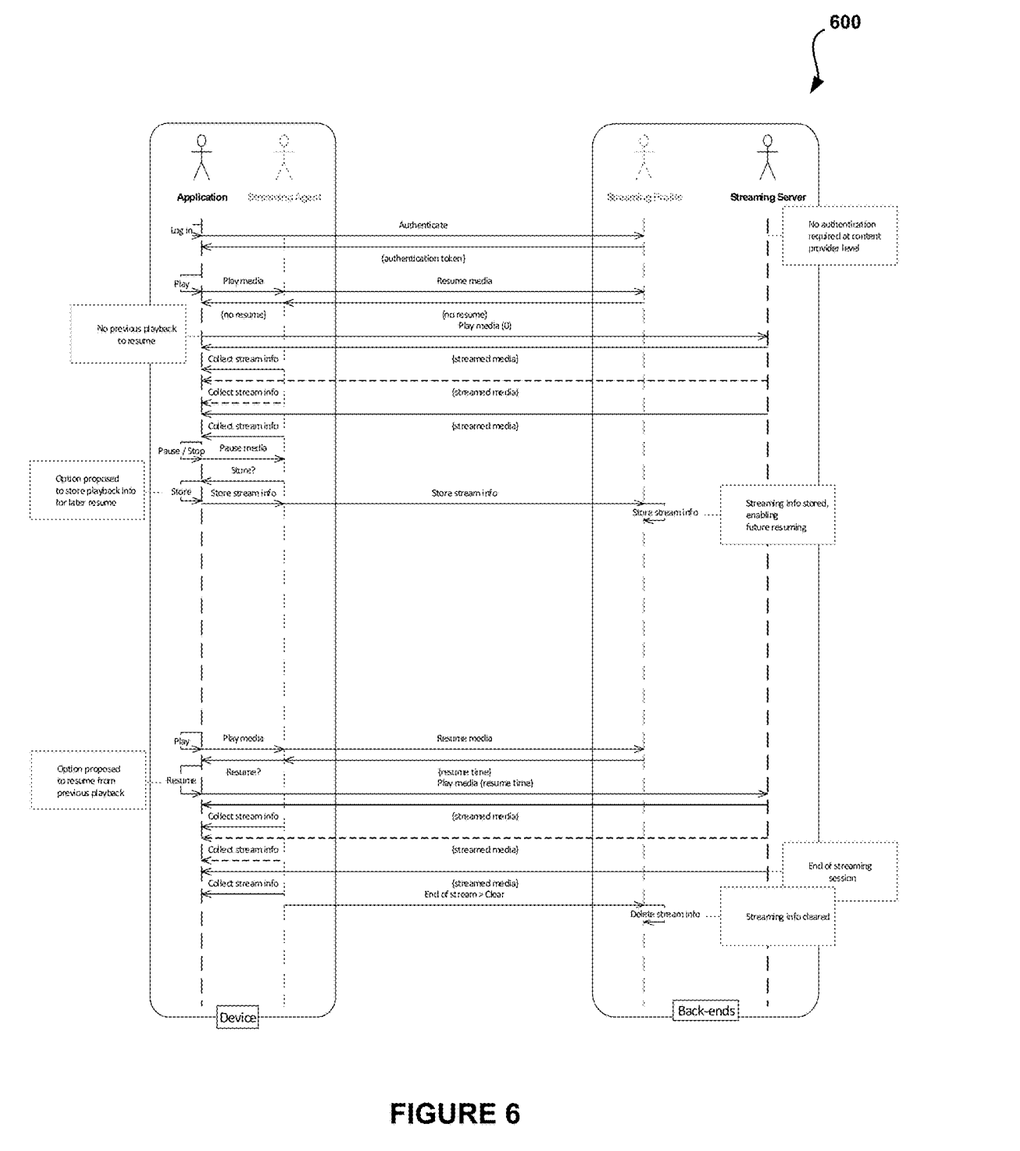
FIG. 6 shows a high level system flow diagram for media content playback management, including partial media consumption on one device, then resuming playback on the same device, in accordance with one embodiment.

FIG. 6 shows a high level system flow diagram 600 for media content playback management, including partial media consumption on one device, then resuming playback on the same device, in accordance with one embodiment. As an option, the system flow diagram 600 may be viewed in the context of the details of the previous figures and/or any subsequent figure(s). Of course, however, the system flow diagram 600 may be viewed in the context of any desired environment. Further, the aforementioned definitions may equally apply to the description below.

As shown, a user device begins streaming media content and the media content play is paused/stopped. The streaming software agent detects this and, in one embodiment, presents the user an option to store playback information (e.g. a current location of the media content, etc.) via a user interface. Upon the selection by the user to store the playback information, the streaming software agent sends the playback information to the profile system to be stored under the user's profile (e.g. utilizing the data structure of FIG. 4, etc.) In one embodiment, the storing of the playback information may occur automatically.

When the user chooses to play that media content again, the software streaming agent queries the profile server for playback information and, upon receiving the information, presents the user with the option to resume playback from the location in which the user stopped previously. Upon selection of this option, the playback is resumed from the location that the user stopped the media content play previously.

Figure 7:
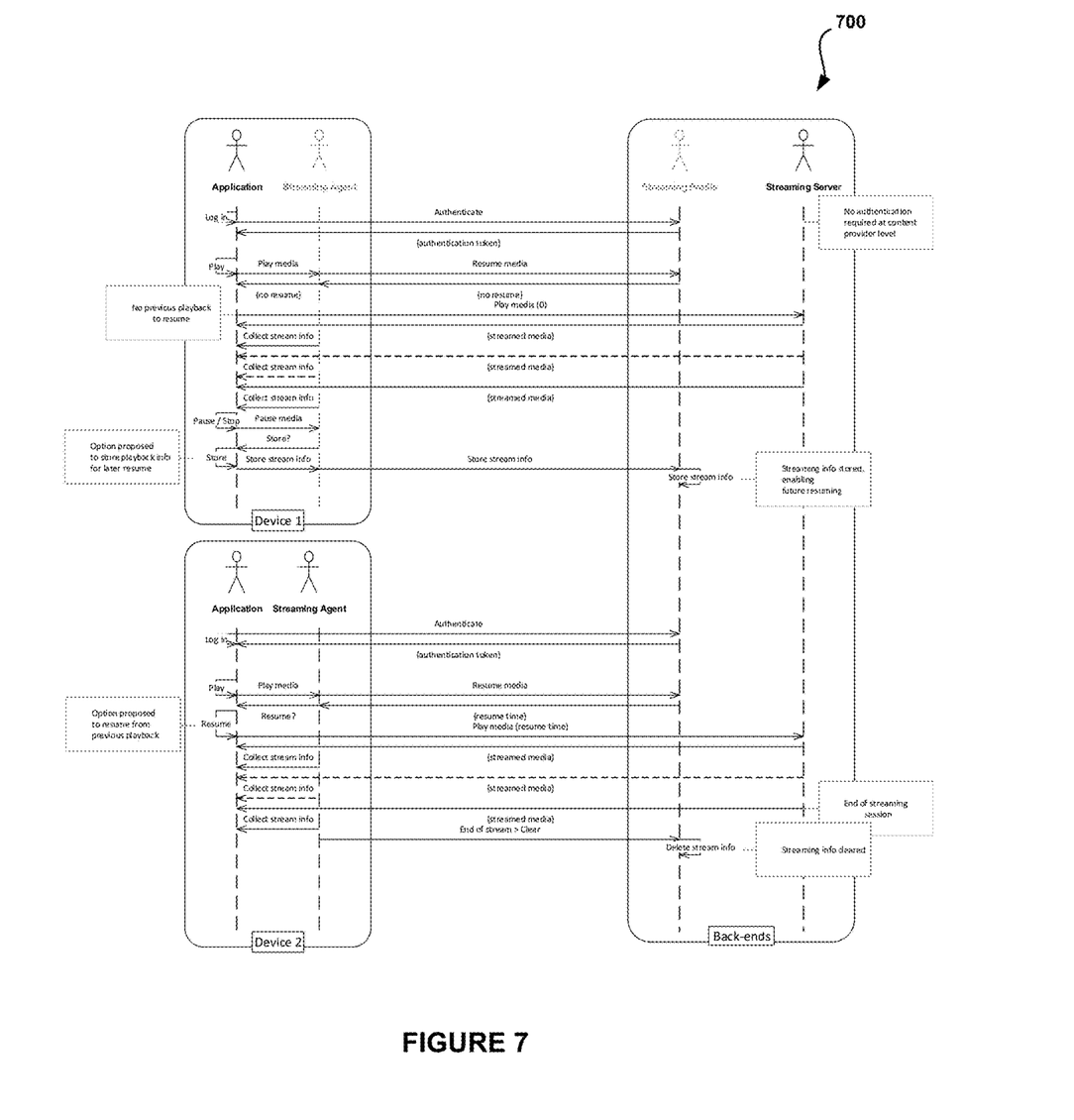
FIG. 7 shows a high level system flow diagram for media content playback management, including partial media consumption on one device, then resuming on another device, in accordance with one embodiment.

FIG. 7 shows a high level system flow diagram 700 for media content playback management, including partial media consumption on one device, then resuming on another device, in accordance with one embodiment. As an option, the system flow diagram 700 may be viewed in the context of the details of the previous figures and/or any subsequent figure(s). Of course, however, the system flow diagram 700 may be viewed in the context of any desired environment. Further, the aforementioned definitions may equally apply to the description below.

As shown, a user of a first user device begins streaming media content and the media content play is paused/stopped. The streaming software agent detects this and, in one embodiment, presents the user an option to store playback information (e.g. a current location of the media content, etc.) via a user interface. Upon the selection by the user to store the playback information, the streaming software agent sends the playback information to the profile system to be stored under the user's profile (e.g. utilizing the data structure of FIG. 4, etc.) In one embodiment, the storing of the playback information may occur automatically.

When the user chooses to play that media content again on a second device, the software streaming agent queries the profile server for playback information and, upon receiving the information, presents the user with the option to resume playback from the location in which the user stopped previously. Upon selection of this option, the playback is resumed from the location that the user stopped the media content play previously.

By utilizing the profile system and the client side streaming agents, a system is provided that is agnostic from media providers in that it works not only for a specific provider, but any of them, being based on data traffic monitoring on the client-side (i.e. on the device). Moreover, the system is agnostic from devices as it allows cross-device experiences, being based on centralized information storage available to all agents. Further, the system is agnostic from applications performing actual media playback, being based on centralized information storage available to all agents, each agent monitoring data traffic for all applications residing on a device. Moreover, the system provides anonymous access to media content as profiles (including personal information) are not stored and managed by media providers, being based on centralized information storage, based on a media provider agnostic account.

Figure 8:
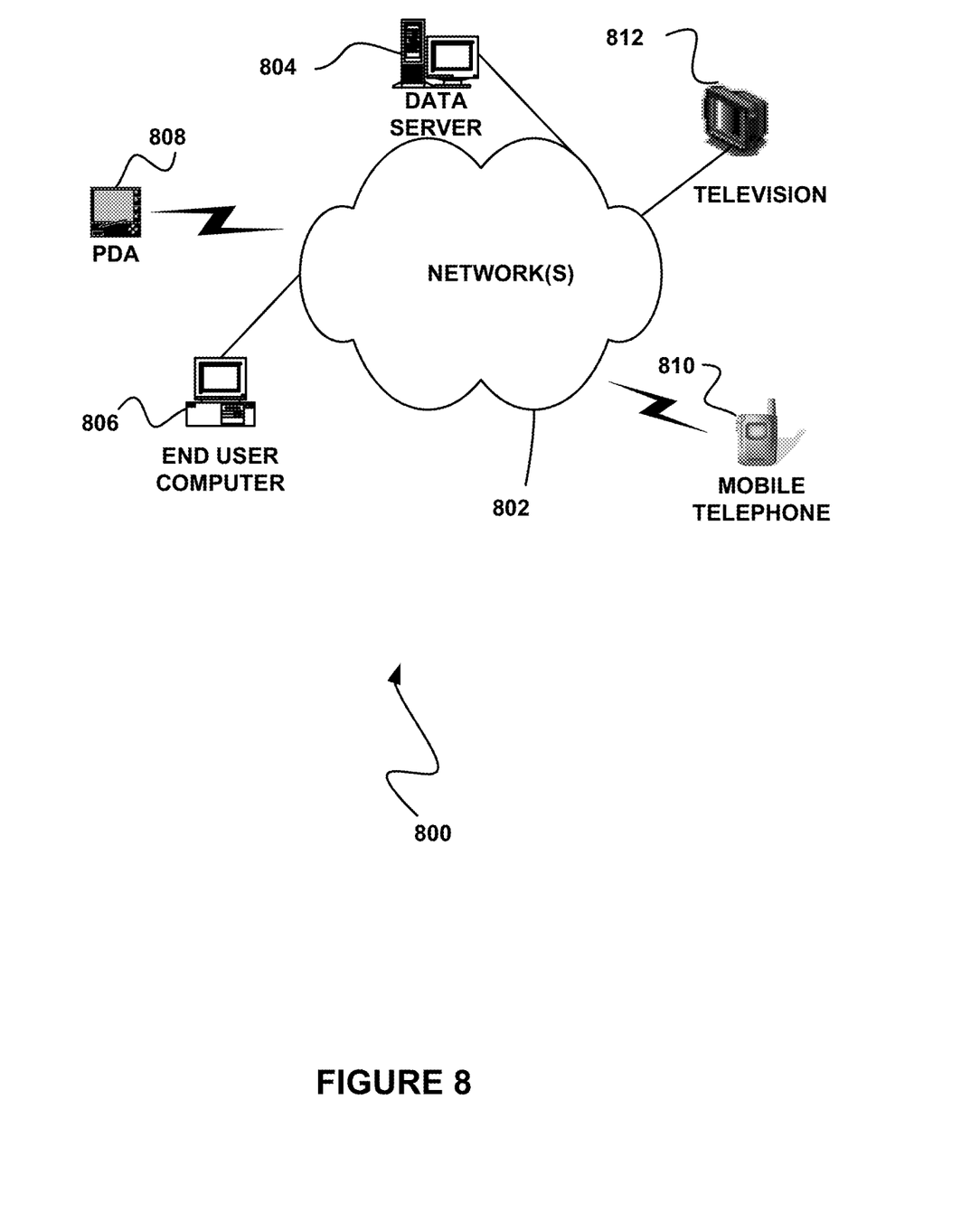
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
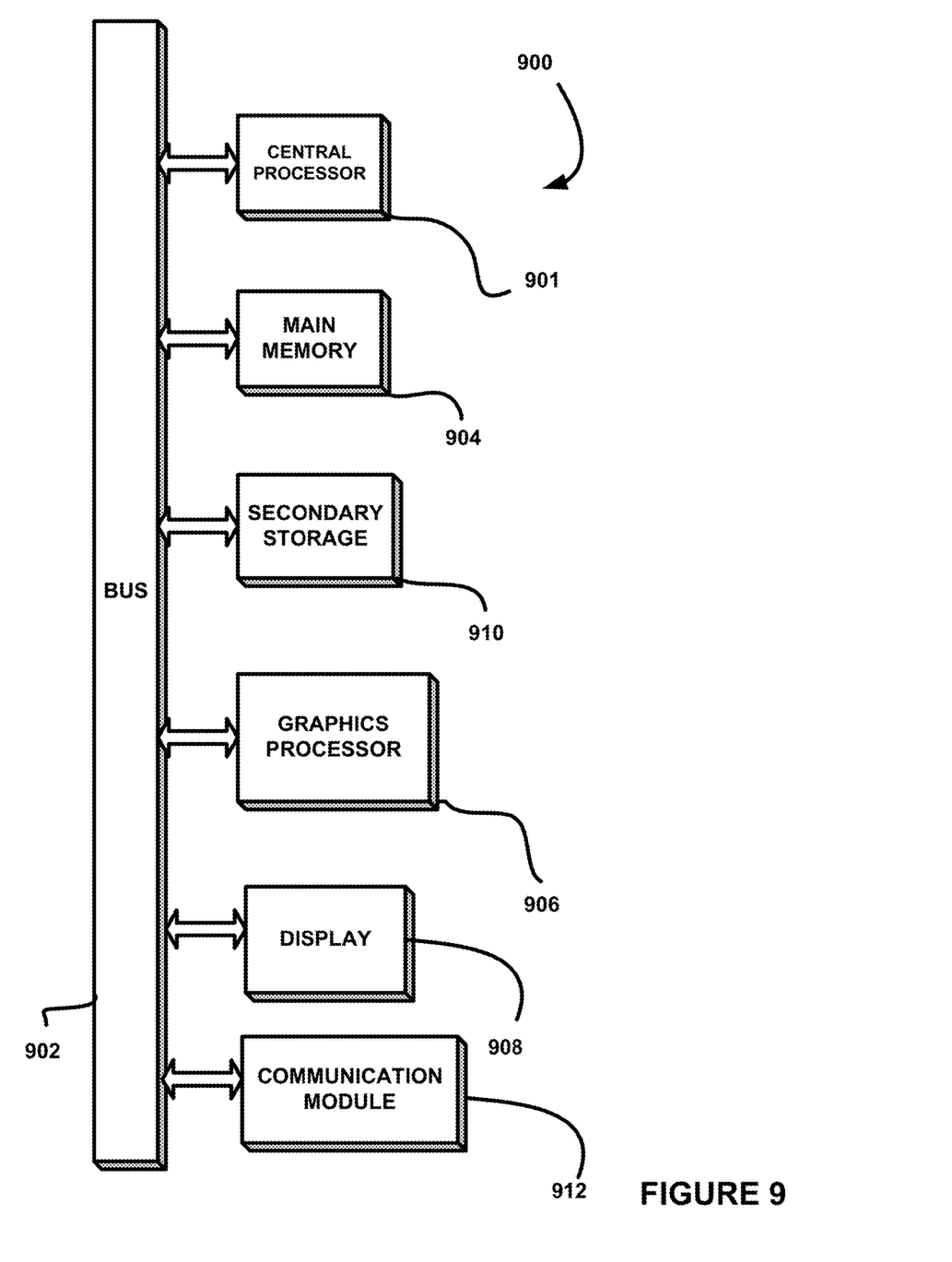
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, at a profile system from a first streaming software agent installed on a first device and monitoring media content being played on the first device from a first local buffer of the first device, media information and current playback information associated with the media content being played on the first device from the first local buffer of the first device;
   identifying, by the profile system, a profile associated with a user of the first device;
   storing, by the profile system, the media information and the current playback information in association with the profile associated with the user of the first device;
   receiving, by the profile system from second streaming software agent installed on a second device, an indication that a request has been made to play the media content on the second device;
   in response to receiving the indication that the request has been made, identifying, by the profile system, that the second device corresponds to the profile associated with the user of the first device;
   in response to identifying that the second device corresponds to the profile associated with the user of the first device, identifying, by the profile system, the current playback information for the media content associated with the profile; and
   sending, by the profile system, the current playback information for the media content to the second device to cause the second device to resume playback of the media content where playback of the media content on the first device stopped.

2. The method of claim 1, wherein the profile system is separate from a system providing the media content.

3. The method of claim 1, wherein at least one of the first device or the second device include a mobile phone.

4. The method of claim 1, wherein at least one of the first device or the second device include a television.

5. The method of claim 1, wherein at least one of the first device or the second device include a computer.

6. The method of claim 1, wherein the first device and the second device are different types of devices.

7. A computer program product embodied on a non-transitory computer readable medium, comprising computer code for:

receiving, at a profile system from a first streaming software agent installed on a first device and monitoring media content being played on the first device from a first local buffer of the first device, media information and current playback information associated with the media content being played on the first device from the first local buffer of the first device;

identifying, by the profile system, a profile associated with a user of the first device;

storing, by the profile system, the media information and the current playback information in association with the profile associated with the user of the first device;

receiving, by the profile system from second streaming software agent installed on a second device, an indication that a request has been made to play the media content on the second device;

in response to receiving the indication that the request has been made, identifying, by the profile system, that the second device corresponds to the profile associated with the user of the first device;

in response to identifying that the second device corresponds to the profile associated with the user of the first device, identifying, by the profile system, the current playback information for the media content associated with the profile; and sending, by the profile system, the current playback information for the media content to the second device to cause the second device to resume playback of the media content where playback of the media content on the first device stopped.

8. The computer program product of claim 7, wherein the profile system is separate from a system providing the media content.

9. The computer program product of claim 7, wherein at least one of the first device or the second device include a mobile phone.

10. The computer program product of claim 7, wherein at least one of the first device or the second device include a television.

11. The computer program product of claim 7, wherein at least one of the first device or the second device include a computer.

12. The computer program product of claim 7, wherein the first device and the second device are different types of devices.

13. A profile system comprising one or more processors operable for:

receiving, at the profile system from a first streaming software agent installed on a first device and monitoring media content being played on the first device from a first local buffer of the first device, media information and current playback information associated with the media content being played on the first device from the first local buffer of the first device;

identifying, by the profile system, a profile associated with a user of the first device;

storing, by the profile system, the media information and the current playback information in association with the profile associated with the user of the first device;

receiving, by the profile system from second streaming software agent installed on a second device, an indication that a request has been made to play the media content on the second device;

in response to receiving the indication that the request has been made, identifying, by the profile system, that the second device corresponds to the profile associated with the user of the first device;

in response to identifying that the second device corresponds to the profile associated with the user of the first device, identifying, by the profile system, the current playback information for the media content associated with the profile; and sending, by the profile system, the current playback information for the media content to the second device to cause the second device to resume playback of the media content where playback of the media content on the first device stopped.

14. The profile system of claim 13, wherein the profile system is separate from a system providing the media content.

15. The profile system of claim 13, wherein at least one of the first device or the second device include a mobile phone.

16. The profile system of claim 13, wherein at least one of the first device or the second device include a television.

17. The profile system of claim 13, wherein at least one of the first device or the second device include a computer.

18. The profile system of claim 13, wherein the first device and the second device are different types of devices.

\* \* \* \* \*